United States Patent [19]

Schoessow

[11] 4,079,967
[45] Mar. 21, 1978

[54] INDUSTRIAL TECHNIQUE

[75] Inventor: Earl E. Schoessow, Seminole, Fla.

[73] Assignee: The Babcock & Wilcox Company, New York, N.Y.

[21] Appl. No.: 570,059

[22] Filed: Apr. 21, 1975

[51] Int. Cl.² .............................................. F16L 41/00
[52] U.S. Cl. ......................................... 285/47; 176/87; 250/358 P; 285/93; 285/192; 285/286
[58] Field of Search .................... 176/87; 285/47, 158, 285/93, 286, 192, 194, 193

[56] References Cited

U.S. PATENT DOCUMENTS

| | | | |
|---|---|---|---|
| 2,203,357 | 6/1940 | Kerr | 285/158 X |
| 2,711,841 | 6/1955 | Schaefer et al. | 285/192 X |
| 2,780,092 | 2/1957 | Govan | 285/158 X |
| 3,085,961 | 4/1963 | Charlesworth | 176/87 X |
| 3,125,358 | 3/1964 | Kleinberg et al. | 285/192 X |
| 3,240,514 | 3/1966 | Bell | 176/87 X |
| 3,488,067 | 1/1970 | Sommer | 285/47 X |
| 3,497,421 | 2/1970 | Thome | 176/87 |
| 3,536,584 | 10/1970 | Long et al. | 176/87 |
| 3,705,734 | 12/1972 | Rajakovics | 285/47 X |
| 3,841,965 | 10/1974 | Degen et al. | 176/87 |
| 3,945,431 | 3/1976 | Straub | 285/93 X |

FOREIGN PATENT DOCUMENTS

| | | | |
|---|---|---|---|
| 1,130,654 | 5/1962 | Germany | 285/47 |
| 1,115,476 | 5/1968 | United Kingdom | 176/87 |

*Primary Examiner*—Thomas F. Callaghan
*Attorney, Agent, or Firm*—J. Maguire; R. J. Edwards

[57] ABSTRACT

A nuclear reactor pressure vessel nozzle penetration device for fluid coolant delivery to the reactor core or to modular heat exchangers located within the vessel is described. The nozzle penetration device comprises a nozzle conduit having an annular double wall open at one end with thermal insulation therebetween, having the outer wall end attached to a portion of the reactor pressure vessel and disposed radially therefrom forming an air space therebetween.

2 Claims, 1 Drawing Figure

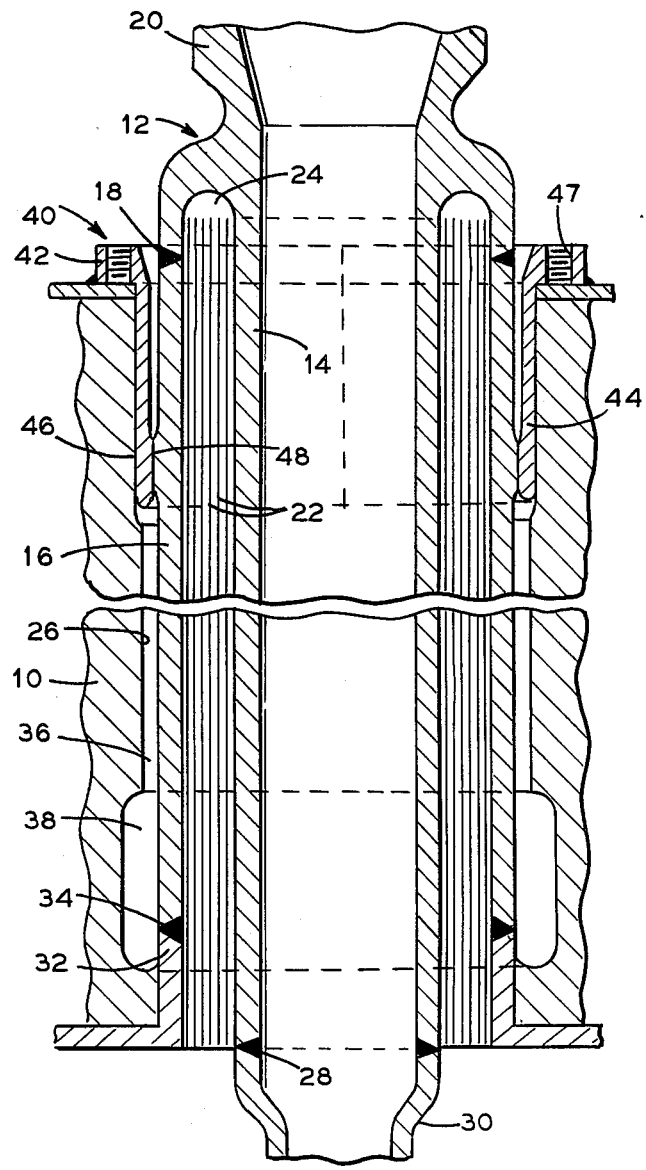

INDUSTRIAL TECHNIQUE

FIELD OF THE INVENTION

This invention relates to pressure vessels and more particularly to a nuclear reactor pressure vessel inlet nozzle penetration device for inlet feed line penetration of the vessel. Accordingly, the general objects of the present invention are to provide novel and improved methods and apparatus of such character.

BACKGROUND OF THE INVENTION

The conventional nuclear reactor power plant comprises a pressure vessel structure which houses, among others, the nuclear core, subassemblies and a fluid coolant for direct or indirect steam generation for conventional electrical power production. Moreover, in certain new systems, it has been suggested to dispose modular heat exchanger units about the inner wall of the pressure vessel in heat exchange relationship with the nuclear core coolant. Secondary fluid flowing through the modular units is converted to steam therein and is directed to electrical power generation means outside of the reactor pressure vessel.

In each of the above described systems, however, the pressure vessel must have inlet penetrations through which either fresh primary core coolant or secondary fluid or secondary coolant enters the pressure vessel to be heated to an elevated temperature. Because this incoming coolant is relatively cold, in contrast to the higher temperature of the thick-walled reactor pressure vessel, not only is there a risk of initiating boiling in the coolant that flows through the inlet, but there also is a risk of establishing unacceptably high stresses within the reactor pressure vessel wall because of temperature related differences in the expansion of the metal in the vessel that is adjacent to and spaced from the cold feedwater inlet.

Furthermore, because of the safety requirements and the extreme costs inherent in a nuclear power plant, an inlet nozzle penetration of the reactor pressure vessel requires special consideration. For example, expensive cladding such as Inconel is generally used to line the inlet penetration bores through the reactor pressure vessel and thereby prevent corrosion of the vessel wall. Furthermore, the restraint stresses developed between the vessel wall and the attached inlet nozzle penetration fittings resultings from thermal and pressure differences between parts usually is a compromise, especially under transients caused by malfunction of feedwater heaters and thermal cycles in operation. In addition, for safety purposes, it is necessary to arrange the inlet nozzle penetration attachment welds such that they meet the requirements of ASME Code Section III. Furthermore, from a cost view point, it is desirable to design nuclear reactor components in a manner which allows practical non-destructive testing thereof and non-destructive inspection, such as x-ray, gamma ray, ultrasonic and penetrant of all the welds.

Accordingly, there is a need to provide an inlet nozzle penetration means which alleviates the thermal stress briefly discussed above, arranges the nozzle penetration welds to conform with ASME codes and arranges the inlet nozzle penetration and the welds associated therewith in such a manner as to allow non-destructive testing and inspection thereof.

SUMMARY OF THE INVENTION

In accordance with the invention; thermal stress between the reactor vessel wall and the inlet nozzle is to a great extent alleviated through a novel inlet nozzle penetration design. This inlet nozzle penetration also arranges all the welds associated therewith to conform to the ASME Code, Section III, and arranges the welds and is itself so arranged as to allow non-destructing testing and inspection thereof. In addition, this novel inlet penetration produces a reactor pressure vessel inlet nozzle penetration in which the reactor wall temperature at the inner wall of the vessel and the nozzle is virtually unaffected by the temperature of the inlet nozzle feed line conducting the cold fluid therethrough.

Specifically, an inlet nozzle penetration that has these features comprises a nozzle conduit having an annular double wall open at one end with thermal insulation therebetween. The outer annular wall is butt welded to a portion of the reactor pressure vessel inside the penetration bore, and the inner nozzle wall is butt welded to the inlet feed line within the reactor pressure vessel. The outer nozzle wall is disposed from the inlet penetration bore by an annular air gapand is supported and attached thereto at the outside end of the nozzle penetration, with respect to the reactor pressure vessel, by sleeve means. The outer nozzle wall is attached to the inner wall at the nozzle's outer end and the nozzle terminates in flange means for attachment to the inlet coolant feed lines.

More specifically, the annulus between the inlet nozzle penetration device and the reactor pressure vessel permits positioning, for example cylindrical x-ray film, over the outer surface of the inner weld for non-destructive inspection thereof. Also, the annular air gap between the reactor pressure vessel and the inlet penetration conduit wall, extending sustantially the whole length of the inlet nozzle penetration, provides for thermal differences therebetween.

The various features of novelty which characterizes the invention are pointed out with particularity in the claims annexed to and forming a part of this specification. For a better understanding of the invention, its operating advantages and specific objects attained by its use, reference should be had to the accompanying drawing and descriptive matter in which there is illustrated and described a preferred embodiment of the invention.

BRIEF DESCRIPTION OF THE DRAWING

The drawing is a fragmentary sectional view of an inlet nozzle penetration of a nuclear reactor pressure vessel constructed in accordance with the concept of this invention.

DETAILED DESCRIPTION OF THE PREFERRED EMBODIMENTS OF THE INVENTION

For a more complete appreciation of the invention, attention is invited to the following description of an illustrative embodiment of the invention, as shown in the attached drawing.

As shown in the drawing, an inlet feed line (not shown) external to a reactor pressure vessel 10 must penetrate the vessel in order to deliver fresh feedwater to the reactor or to heat exchanger units located therein. However, as discussed above, the thermal stress between the reactor vessel wall and the cold inlet feedwater penetration inlet must be alleviated. Furthermore, non-destructive inspection of the inlet penetration must be provided for.

In order to cope with these problems, coolant inlet nozzle penetration apparatus 12, built in accordance with the invention has an inlet coolant tube or inner nozzle wall 14 and a concentric outer tube or wall 16 of substantially the same length spaced therefrom. The inner wall 14 is joined to outer wall 16 at a weld 18, and terminates into flange means 20 for attachment to the coolant feed lines (not shown). A sleeve 22 of insulating material, e.g., several laminations of metal foil insulation is lodged in the annulus that is formed between the inner and and outer nozzle penetration walls. The sleeve 22 extends from the inner wall of the vessel to a slight distance beyond the plane of the vessel's outer wall in order to nest within a recess 24 that is formed in the penetration apparatus, and serves as a thermal barrier between the vessel and the inlet coolant.

The penetration apparatus 12 extends within a penetration bore 26 that is formed in the reactor pressure vessel 10. The inner wall 14 is joined at a weld 28 to a feedwater line 30 within the reactor vessel, and outer wall 16 is joined to a prepared surface 32, e.g., an INCONEL clad surface of the reactor vessel at weld 34. The attachment weld 34 is in fact the inlet penetration attachment weld to the vessel wall. This attachment weld is the full thickness of the inlet nozzle outer wall and, therefore, develops full strength as required by ASME Code Section III.

The outer wall 16 of the inlet nozzle penetration is concentric with and spaced from the surface of the penetration bore 26 which extends from the outside end of the inlet to some small distance beyond the attachment weld 34. The annulus or air gap 36 between the outer wall 16 and the penetration bore 26 provides another thermal barrier between the vessel and the feedwater. Furthermore, the annulus terminates in a relief 38 about the attachment weld which assists in avoiding a high stress concentration between the weld build up at the weld 34 and the reactor pressure vessel wall.

In accordance with this invention, the annulus 36 and the relief 38 permit the attachment weld 34 to be nondestructively inspected by commonly known X-ray, gamma ray, ultrasonic or penetration techniques. For example, an x-ray film (not shown) is inserted in the annulus 36 and disposed in space surrounding relationship to the attachment weld 34 in the relief 38. An x-ray source (not shown) disposed within the conduit of the inlet nozzle apparatus 12 passes the x-rays through the weld 34 and exposes the film located within the relief 38. The soundness of the weld 34 is thereby readily established by examination of the retrieved film. In this manner, it is relatively simple and practicable to non-destructively inspect the attachment weld 34.

In order to provide additional support and to secure the inlet nozzle apparatus 12 within the inlet bore 26, a two-piece sleeve 40 is attached to the outside of the reactor vessel 10 and extends within the annulus 36. The sleeve 40 is a generally cylindrical element divided in a direction parallel to the longitudinal axis along a diameter thereof. The two-piece construction promotes both insertion in and withdrawal from the annulus 36, and allows the inlet feed lines to remain attached to the nozzle apparatus while the sleeve is being inserted or removed. Each piece of the sleeve 40 is provided with an outer member 42 which is attached, to the outside wall of the reactor pressure vessel; and an inner member 44 extending within the annulus 36. The outer member 42 is attached to the outside wall of the reactor pressure vessel, for example, as shown in the attached figure, the member 42 is tack welded to a cladded, e.g. INCONEL, surface of the vessel. The tack weld secures the sleeve 40 and prevents displacement thereof from the inlet bore 26.

The inner member 44 contacts both the penetration bore 26 and the nozzle's outer wall 16, for example at contact points 46 and 48 respectively. Thereby, the nozzle is tightly positioned within the bore and is prevented from imposing forces and/or moments on the attachment weld 34 by displacement of the nozzle from its initial position. Furthermore, the member 44 restricts the fluid leakage through the annulus 36 should a leak occur in the outer wall 16.

In operation, moreover, the sleeve 40 may be readily removed from the annulus by grinding off or breaking the tack welds and advancing a bolt in bolt holes 47 provided in the outer member 42. Since further advancement of the bolt is prevented by the vessel wall, the driving bolt withdraws the sleeve 40 from the annulus 36.

The Embodiments of the Invention in Which an Exclusive Property or Privilege is Claimed are Defined as Follows:

1. In combination with a pressure vessel wall having at least one bore extending therethrough, a penetration device fitted into the bore, the device comprising an inner tubular member defining a fluid flow passageway through the bore, an outer tubular member concentrically spaced about the inner member and forming therebetween a first annular cavity extending at least the length of the bore, thermal insulating material disposed within the cavity, the inner and outer members having adjacent ends seal weld-united outside of the bore, the outer member having its other end seal welded to a vessel section longitudinally extending within the bore and terminating intermediate the ends of the bore, and portions of the outer member and vessel section being radially spaced from the bore to form therebetween a second annular cavity extending to the outer surface of the vessel wall, the bore being formed with a circumferential enlarged recess along an inner end portion of the second cavity, the recess and second cavity cooperating with one another to define an annular chamber facing the seal weld junction between the outer member and vessel section, and wherein the chamber provides access for non-destructive inspection of said seal weld junction.

2. The combination according to claim 1 including means for supporting the penetration device within the bore, the support means comprising a split sleeve extending into the second cavity, the sleeve having a shoulder portion secured to the outer surface of said vessel wall.

* * * * *